(12) United States Patent
Mundy et al.

(10) Patent No.: US 8,549,477 B2
(45) Date of Patent: Oct. 1, 2013

(54) MAPPING USAGE PATTERNS USING CODE FEATURES

(75) Inventors: Kiran Mundy, Lexington, MA (US); Margaret Wasowicz, Charlotte, NC (US)

(73) Assignee: Oracle International Corporation, Redwood Shores, CA (US)

( * ) Notice: Subject to any disclaimer, the term of this patent is extended or adjusted under 35 U.S.C. 154(b) by 838 days.

(21) Appl. No.: 12/606,493

(22) Filed: Oct. 27, 2009

(65) Prior Publication Data

US 2011/0099432 A1    Apr. 28, 2011

(51) Int. Cl.
*G06F 9/44*    (2006.01)

(52) U.S. Cl.
USPC .................................. 717/124; 714/45

(58) Field of Classification Search
None
See application file for complete search history.

(56) References Cited

U.S. PATENT DOCUMENTS

| | | | | |
|---|---|---|---|---|
| 5,590,056 | A * | 12/1996 | Barritz | 702/186 |
| 6,167,358 | A | 12/2000 | Othmer et al. | |
| 6,405,214 | B1 | 6/2002 | Meade, II | |
| 6,862,696 | B1 | 3/2005 | Voas et al. | |
| 7,197,431 | B2 * | 3/2007 | Barritz | 702/186 |
| 7,197,747 | B2 * | 3/2007 | Ishizaki et al. | 717/146 |
| 7,484,095 | B2 * | 1/2009 | de Jong | 713/170 |
| 7,490,045 | B1 | 2/2009 | Flores et al. | |
| 7,925,635 | B1 * | 4/2011 | Ravulur et al. | 707/688 |
| 2005/0081102 | A1 * | 4/2005 | Ludden et al. | 714/32 |
| 2005/0155025 | A1 * | 7/2005 | DeWitt et al. | 717/158 |
| 2006/0242638 | A1 | 10/2006 | Lew et al. | |
| 2009/0249301 | A1 * | 10/2009 | Kalla et al. | 717/127 |

FOREIGN PATENT DOCUMENTS

| | | |
|---|---|---|
| WO | WO03025752 A2 | 3/2003 |
| WO | WO03042835 A1 | 5/2003 |

OTHER PUBLICATIONS

"Gathering Feedback on User Behaviour Using AspectJ", AOSD 2006, 5th International Conference on Aspect-Oriented Software Development, Industry Track Proceedings, Bonn, Germany, Mar. 20-24, 2006, pp. 1-79, Universitatbonn, http://aosd.net/2006/archive/AOSD06-IndustryTrackProceedings.pdf.

Slinger Remy Lokien Jansen, "Customer Configuration Updating in a Software Supply Network", Jun. 1, 1980, pp. 1-234, Rotterdam, The Netherlands, http://homepages.cwi.nl/~paulk/dissertations/SlingerJansen.pdf.

"Pogo", Visual C++ Team Blog, Jun. 22, 2009, pp. 1-6, Microsoft Corporation, http://blogs.msdn.com/vcblog/archive/2008/11/12/pogo.aspx.

* cited by examiner

*Primary Examiner* — Elias Mamo
(74) *Attorney, Agent, or Firm* — Miles & Stockbridge P.C.

(57) ABSTRACT

A usage pattern detector includes a determining module configured to determine that a monitored code feature of a software application has been executed on a first computer. The usage pattern detector also includes a recording module configured to record an indication that the monitored code feature has been used and an indication providing module configured to provide the indication that the monitored code feature has been used to a second computer.

20 Claims, 3 Drawing Sheets

MAPPING USAGE PATTERNS USING CODE FEATURES

FIELD

One embodiment is directed generally to computer systems, and in particular to detecting usage in computer systems.

BACKGROUND

Generally, software applications are developed with a set of features that are believed to be helpful to users. Once a product is rolled out, the software developer does not know precisely which features of the software are being used and which are not. To estimate usage of software application features, some developers approximate the extent of usage by counting the number of bugs logged in each feature.

SUMMARY

In an embodiment, a usage pattern detector includes a determining module configured to determine that a monitored code feature of a software application has been executed on a first computer. The usage pattern detector also includes a recording module configured to record an indication that the monitored code feature has been used and an indication providing module configured to provide the indication that the monitored code feature has been used to a second computer.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which.

DETAILED DESCRIPTION

In some embodiments, usage patterns of code features of a specific software application may be determined by monitoring how many times users make use of, or execute, the code features. In this manner, usage of code features of a software application may be monitored by a software developer based on actual use of the software by users. This monitoring may allow a software developer or corporation to better predict how useful features are based on the actual use thereof.

When a software application is developed with a set of code features, developers may find it useful to add in code features that are perceived to be most needed by users. Developers may also find it helpful to optimize code features that are heavily used, code features that will help users accomplish work most efficiently, and/or code features that save users the most time. In this context, a "user" may be any person or collective entity using the software, such as a specific customer or members of an entity such as a corporation. However, once a product is rolled out, there is currently no reliable way to know which code features are being used, which code features are not, and how frequently each code feature is used. While a rough assessment of the number of bugs logged in a certain area may provide a rough approximation of usage in some cases, this is a very approximate number and is often inaccurate.

Accordingly, some embodiments of the present invention embed virtual counters within code features of the software application. In some embodiments, code features are identified by a set of decision points, or a flow, that a user is presented under certain circumstances by a software application. For example, in a software application that provides functionality for setting up a contract project, a user is presented with the contract project flow. The decisions to create a contract project and to make use of various features during the creation process are branches of the contract project flow that lead to certain code features. In other words, a monitored code feature may be associated with any selection or action performed by the user. In some embodiments, when a branch associated with a code feature is taken, the virtual counter associated with the code feature is incremented (for example, using the "++" operator in C++ or Java). However, the virtual counter may be incremented at any time during or after usage of the code feature, and other embodiments of the present invention do not increment the virtual counter immediately upon taking a code branch associated with a code feature. In this manner, the actual number of times that each code feature is used can be calculated and a better estimate of which code features are being used and which code features are not being used can be achieved.

Figure 1:
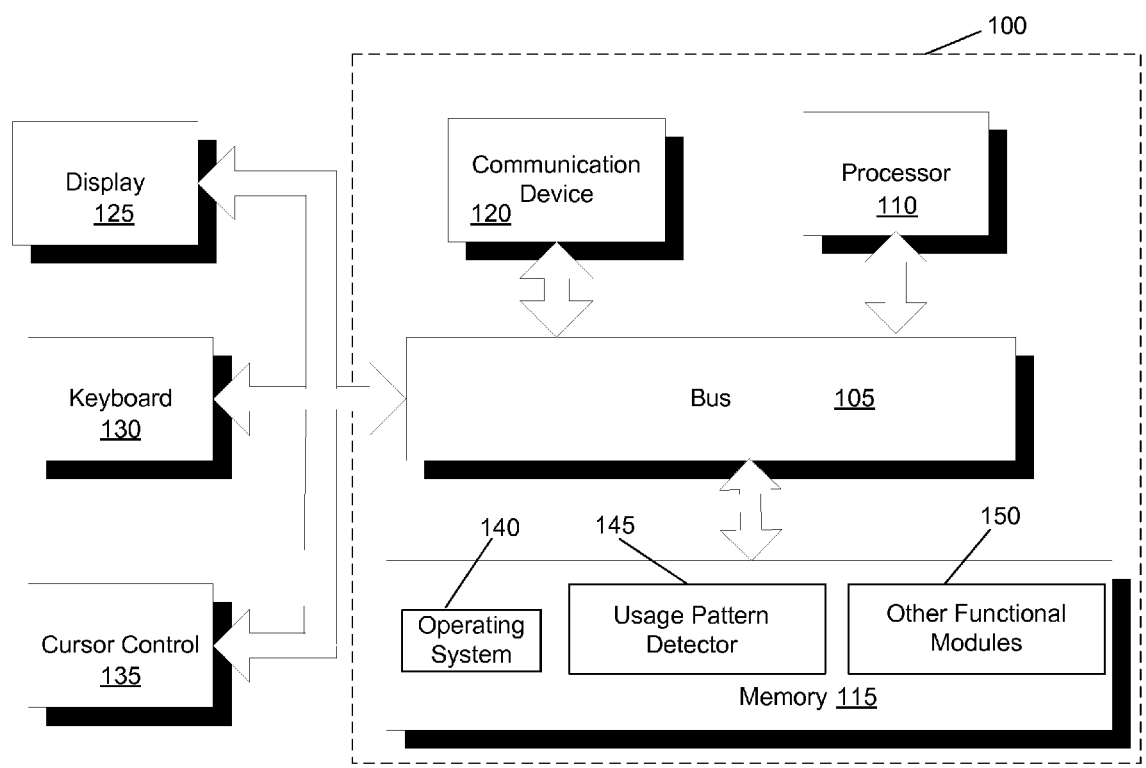
FIG. 1 is a block diagram illustrating a computer having a usage pattern detector that can implement an embodiment of the present invention.

FIG. 1 is a block diagram of a computer 100 that can implement an embodiment of the present invention. Computer 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Computer 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, computer 100 includes a communication device 120, such as a network interface card, to provide access to a network. Therefore, a user may interface with computer 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as server status information. A keyboard 130 and a cursor control device 135, such as a computer mouse, is further coupled to bus 105 to enable a user to interface with computer 100.

In one embodiment, memory 115 stores software modules that provide functionality when executed by processor 110. The modules include an operating system 140 that provides operating system functionality for computer 100. The modules further include a usage pattern detector 145 that is a piece of code called from various execution points within specific features. This piece of code is passed data that indicates which feature was called, and at which specific branch. The usage pattern detector code may log this information into local tables at the user site to indicate that specific code has executed. Computer 100 can be part of a larger system such as a cluster computing system, a distributed computing system, a cloud computing system, a "server farm" or any other system having multiple servers and/or computing devices. Computer 100 will typically include one or more additional functional modules 150 to include additional functionality. In some embodiments, usage pattern detector 145 may be part of operating system 140 or part of one or more other functional modules included in other functional modules 150.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
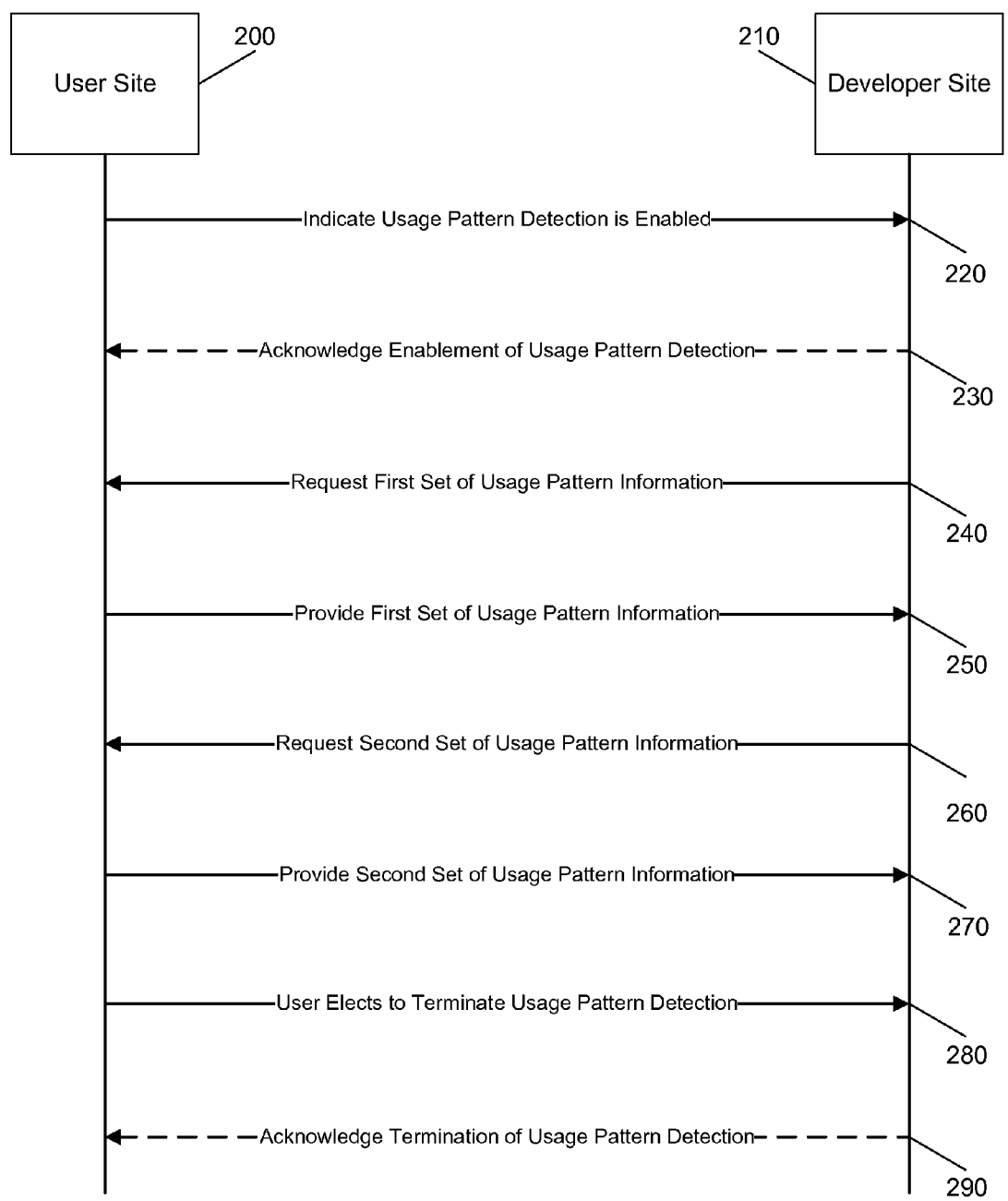
FIG. 2 is a timing diagram of detecting usage patterns according to an embodiment of the present invention.

FIG. 2 is a timing diagram of detecting usage patterns according to an embodiment of the present invention. In this embodiment, the timing diagram illustrates signaling regarding usage pattern functionality sent between a user site 200 having one or more computers and a developer site 210 having one or more computers. While all communication occurs between user site 200 and developer site 210 in FIG. 2, some or all of the communication may occur between the sites and a third party site acting as an intermediary for data collection.

In some embodiments, computers of user site 200 may include usage pattern detector 145 of FIG. 1. While some embodiments perform usage pattern monitoring without prompting users for permission, the embodiment illustrated in FIG. 2 prompts users before performing usage pattern detection. A user may either grant permission to detect usage patterns for all code features having monitoring functionality or the user may specify the specific code features that are permitted to be monitored. The user may also choose the level at which the usage pattern detector operates (for instance, setting the reporting time interval to report detection that a code feature is used immediately, reporting only once each specified time interval (such as once every day), limiting reporting to low usage periods such as night, etc.).

When a user chooses to enable usage pattern detection, a message indicating that usage pattern detection is enabled is sent at 220. The message may include various parameters indicating the time interval and which code features are to be monitored. Developer site 210 then acknowledges the enablement of usage pattern detection at 230. User site 200 then monitors usage patterns based on number of times a code feature is used and/or code feature usage time. At some point, developer site 210 requests a first set of collected usage pattern information at 240 that has been collected during a certain time period. User site 200 then provides the first set of usage pattern information to developer site 210 at 250. While the user keeps the permissions for usage pattern detection the same, user site 200 will continue to provide usage pattern upon request from developer site 210 in accordance with the permissions set by the user. In FIG. 2, developer site 210 requests a second set of usage pattern information collected during a second time period at 260. In response to this request, user site 200 provides the second set of usage pattern information to developer site 210 at 270.

At some point, the user may subsequently choose to modify or terminate usage pattern detection. In this case, the user elects to terminate usage pattern detection and the election is provided to developer site 210 at 280. Developer site 210 then acknowledges the message at 290. In some implementations, some or all of the acknowledgements may be omitted.

Figure 3:
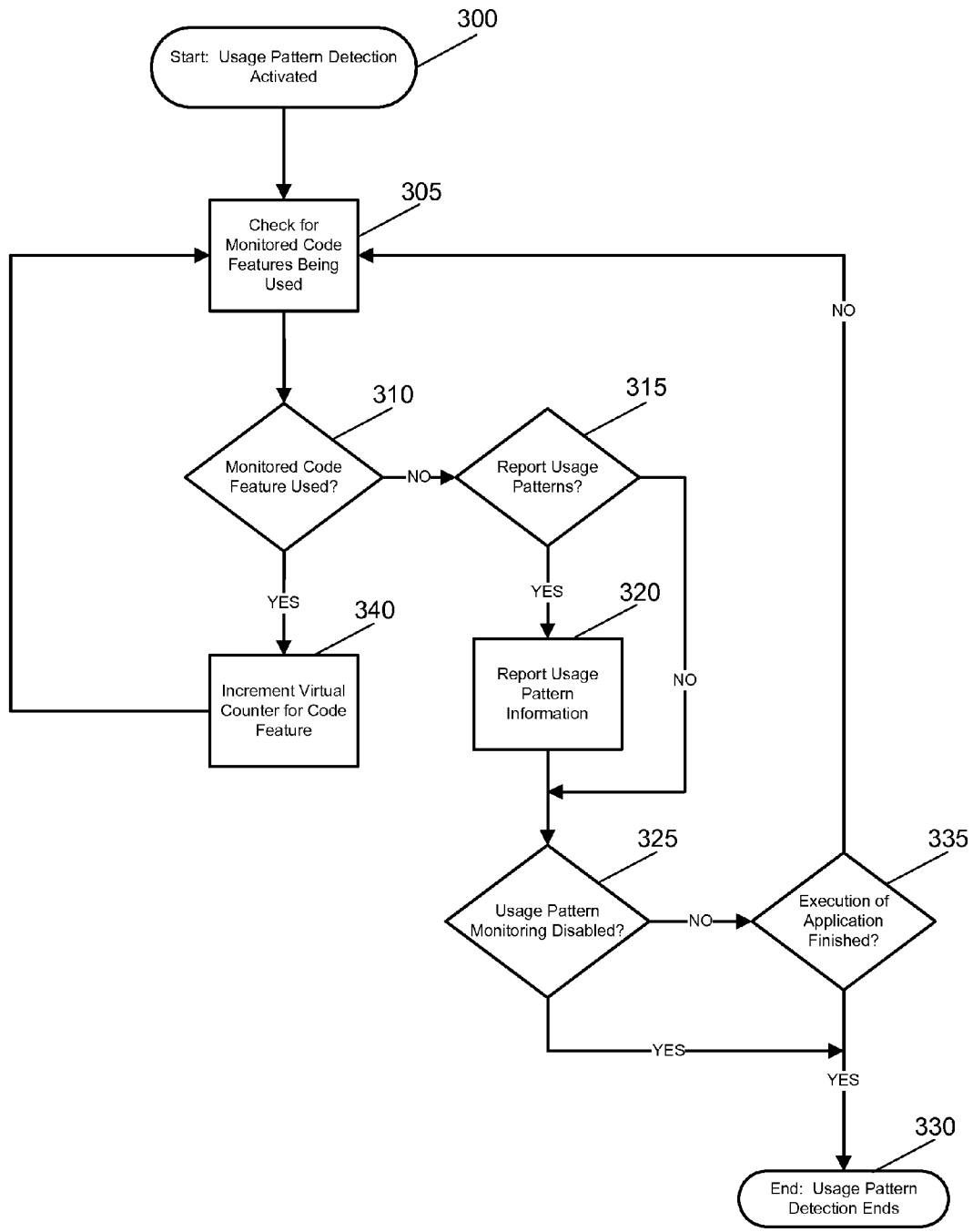
FIG. 3 is a flow diagram illustrating a process flow for detecting usage patterns according to an embodiment of the present invention.

FIG. 3 is a flow diagram illustrating a process flow for detecting usage patterns according to an embodiment of the present invention. In some embodiments, the functionality of FIG. 3 is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 3 may be performed, for example, by computer 100 of FIG. 1 via usage pattern detector 145. In FIG. 3, the process flow begins with usage pattern detector 145 being activated at 300. Since reporting is generally less frequent than the logging, in some embodiments, reporting may not be in the same process as the logging operations. In such cases, the "reporting" may be a separate service that fires off from the developer site, and polls each user site for data, collecting the data and allowing each user site to set their counters down to zero again. This activation may be enabled manually by a user of the software application associated with the usage pattern detection or may be automatically enabled by the software application. Usage pattern detector 145 then checks whether a monitored code feature has been used at 305.

If usage pattern detector 145 does not determine that a monitored code feature has been used at 310, usage pattern detector 145 checks whether a request to report usage patterns has been received from a developer site at 315. Such a determination could be made based on a process running on the user computer that handles such requests. Some embodiments instead perform reporting absent a request for the developer site based on periodic reporting, time of day, occurrence of an event, a request from another computer or any other mechanism at the discretion of the implementer. The determination could also be made by a job installed on the user's computer that periodically sends collected code feature and/or usage time indications to another computer. If usage patterns are to be reported, usage pattern detector 145 reports usage pattern information at 320. Usage pattern detector 145 then checks whether usage pattern monitoring has been disabled at 325. If so, usage pattern detection ends at 330. If not, if execution of the software application that is being monitored has ended at 335, usage pattern detection ends at 330. If execution has not ended, the process returns to checking whether monitored code features have been used at 305.

If a monitored code feature has been used at 310, usage pattern detector 145 increments a virtual counter associated with the code feature at 340. As noted previously, the virtual counter may involve incrementing the value of a variable associated with the code feature. In this manner, the number of times a code feature was used and/or the usage time of a code feature may be calculated. In some embodiments, a usage pattern detector may monitor the number of times that code features are used by a user. This information may then be reported, for example, to a developer of the monitored software application so the usage pattern information can be used to improve future versions of the software.

While the term "computer" has been used in the description of some embodiments of the present invention, the invention may be applied to many types of network computing devices. For purposes of this invention, the term "computer" includes rack computing systems, cloud computing systems, distributed computing systems, personal computers, laptops, cell phones, personal digital assistants, tablet computing devices, mainframes, any networked devices that perform computing operations, and the like.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer-readable medium having instructions stored thereon that, when executed by a processor, cause the processor to determine usage patterns, the determining comprising:
    determine that a monitored code feature of a software application has been executed on a first computer;
    record an indication that the monitored code feature has been used; and
    provide the indication that the monitored code feature has been used to a second computer;
    wherein the monitored code feature is one feature of a plurality of code features that comprise the software application and is associated with a branch within the software application; and
    the determining that the monitored code feature has been executed comprises determining that the branch has been taken when the software application is executing, wherein the branch has been taken in response to an action by a user of the software application, the action taken in response to the monitored code feature identified as a decision point presented to the user while the user is interacting with the software application.

2. The computer-readable medium of claim 1, wherein the indication that the monitored code feature has been used is recorded by a virtual counter embedded within the monitored code feature.

3. The computer-readable medium of claim 1, wherein the determining further comprising:
    accept, from a user of the first computer, a selection of an option to provide the indication that the monitored code feature has been used to the second computer.

4. The computer-readable medium of claim 3, wherein the determining further comprising:
    deactivate providing of the indication that the monitored code feature has been used to the second computer responsive to a selection of an option by the user of the first computer.

5. The computer-readable medium of claim 1, wherein the providing of the indication is performed by a job installed on a user site associated with the first computer that periodically sends collected indications that code features were used to the second computer.

6. The computer-readable medium of claim 1, wherein the second computer is configured to increment a counter for a specific user associated with the software application, an installation of the software application, a product feature of the software application, a calendar period of when the code feature was used and an identifier for the particular code feature that was used, in response to receiving the indication that the monitored code feature has been used.

7. The computer-readable medium of claim 1, wherein indications that monitored code features have been used enable the second computer to map usage of specific products and specific code features of the software application.

8. A usage pattern detector, comprising:
a processor;
a non-transitory computer readable medium coupled to the processor and comprising a determining module, a recording module and an indication providing module;
the determining module, when executed by the processor, configured to determine that a monitored code feature of a software application has been executed on a first computer;
the recording module, when executed by the processor, configured to record an indication that the monitored code feature has been used; and
the indication providing module, when executed by the processor, configured to provide the indication that the monitored code feature has been used to a second computer;
wherein the monitored code feature is one feature of a plurality of code features that comprise the software application and is associated with a branch within the software application; and
the determining that the monitored code feature has been executed comprises determining that the branch has been taken when the software application is executing;
wherein the branch has been taken in response to an action by a user of the software application, the action taken in response to the monitored code feature identified as a decision point presented to the user while the user is interacting with the software application.

9. The usage pattern detector of claim 8, wherein the recording module comprises a virtual counter embedded within the monitored code feature.

10. The usage pattern detector of claim 8, wherein the indication providing module comprises a job installed on a user site associated with the first computer that periodically sends collected indications that code features were used to the second computer.

11. The usage pattern detector of claim 8, wherein the second computer is configured to increment a counter for a specific user associated with the software application, an installation of the software application, a product feature of the software application, a calendar period of when the code feature was used and an identifier for the particular code feature that was used, in response to receiving the indication that the monitored code feature has been used.

12. The usage pattern detector of claim 8, wherein indications that monitored code features have been used enable the second computer to map usage of specific products and specific code features of the software application.

13. A computer-implemented method for detecting usage patterns, comprising:
determining that a monitored code feature of a software application has been executed on a first computer of a user site;
recording an indication, via a virtual counter embedded within the monitored code feature, that the monitored code feature has been used; and
providing the indication that the monitored code feature has been used to a second computer of a developer of the software application, wherein the providing of the indication is performed by a job installed on a user site associated with the first computer that periodically sends collected indications that code features were used to the second computer;
wherein the monitored code feature is one feature of a plurality of code features that comprise the software application and is associated with a branch within the software application; and
the determining that the monitored code feature has been executed comprises determining that the branch has been taken when the software application is executing;
wherein the branch has been taken in response to an action by a user of the software application, the action taken in response to the monitored code feature identified as a decision point presented to the user while the user is interacting with the software application.

14. The computer-implemented method of claim 13, further comprising:
incrementing, by the second computer, a counter for a specific user associated with the software application, an installation of the software application, a product feature of the software application, a calendar period of when the code feature was used and an identifier for the particular code feature that was used, in response to receiving the indication that the monitored code feature has been used.

15. The computer-implemented method of claim 13, wherein indications that monitored code features have been used enable the second computer to map usage of specific products and specific code features of the software application.

16. The usage pattern detector of claim 8, the indication providing module further configured to accept, from a user of the first computer, a selection of an option to provide the indication that the monitored code feature has been used to the second computer.

17. The usage pattern detector of claim 16, the indication providing module further configured to deactivate providing of the indication that the monitored code feature has been used to the second computer responsive to a selection of an option by the user of the first computer.

18. The computer-readable medium of claim 1, the indication comprising at least one of a first number of times the monitored code feature has been used or a second number of usage time of the monitored code feature.

19. The usage pattern detector of claim 8, the indication comprising at least one of a first number of times the monitored code feature has been used or a second number of usage time of the monitored code feature.

20. The method of claim 16, the indication providing module further configured to accept, from a user of the first computer, a selection of an option to provide the indication that the monitored code feature has been used to the second computer.

* * * * *